UNITED STATES PATENT OFFICE.

ORRIN W. STORER, OF SNELLING, CALIFORNIA.

LINIMENT.

SPECIFICATION forming part of Letters Patent No. 352,278, dated November 9, 1886.

Application filed July 6, 1886. Serial No. 207,277. (No specimens.)

*To all whom it may concern:*

Be it known that I, ORRIN WILCOX STORER, of Snelling, Merced county, State of California, have invented a new and useful Composition of Matter to be used as a Lotion or Liniment, of which the following is a specification.

My composition consists of the following ingredients, combined in substantially the proportions stated, viz: best wine, one gallon; rock-salt, one and a half pound; saltpeter, one and a half pound; West India molasses, one-half gallon; oil of vitriol, one-quarter pound; spirits of turpentine, one tea-spoonful; essence of sassafras, one tea-spoonful. These ingredients are to be combined in the following manner: The rock-salt and the saltpeter are placed in the wine and dissolved therein by the application of heat. While still hot the West India molasses is added. After cooling, the oil of vitriol is added and the mixture is then bottled. To the contents of each bottle are added the turpentine and the sassafras.

The liniment is to be used in the same manner as other liniments and for similar purposes.

Having thus described my invention, what I claim as new, and desire to secure by Letters Patent, is—

The herein-described composition of matter to be used as a liniment, consisting of wine, rock-salt, saltpeter, molasses, oil of vitriol, spirits of turpentine, and essence of sassafras, combined in the proportions substantially as herein described.

In witness whereof I have hereunto set my hand.

ORRIN W. STORER.

In presence of—
  I. J. BUCKLEY,
  J. A. HARRELSON.